United States Patent
Watanabe

(10) Patent No.: US 8,217,610 B2
(45) Date of Patent: Jul. 10, 2012

(54) POWER TOOLS

(75) Inventor: Masahiro Watanabe, Anjo (JP)

(73) Assignee: Makita Corporation, Anjo-shi (JP)

( * ) Notice: Subject to any disclaimer, the term of this patent is extended or adjusted under 35 U.S.C. 154(b) by 1036 days.

(21) Appl. No.: 12/216,577

(22) Filed: Jul. 8, 2008

(65) Prior Publication Data

US 2009/0015183 A1 Jan. 15, 2009

(30) Foreign Application Priority Data

Jul. 9, 2007 (JP) ................. 2007-179253

(51) Int. Cl.
*B25F 5/00* (2006.01)
*H02P 29/00* (2006.01)

(52) U.S. Cl. ............... 318/441; 173/20; 310/50; 81/469

(58) Field of Classification Search ................. 318/432, 318/434, 441; 173/2, 18, 20, 217; 307/126, 307/140; 310/47, 50; 81/467, 469
See application file for complete search history.

(56) References Cited

U.S. PATENT DOCUMENTS

| | | | | | |
|---|---|---|---|---|---|
| 5,444,214 | A | * | 8/1995 | Crouse et al. ................. | 219/133 |
| 5,617,018 | A | * | 4/1997 | Earle ............................. | 324/72.5 |
| 6,087,815 | A | * | 7/2000 | Pfeifer et al. ................. | 323/282 |
| 6,222,285 | B1 | * | 4/2001 | Haley et al. ................... | 307/129 |
| 6,518,719 | B1 | * | 2/2003 | Suzuki et al. ................. | 318/430 |
| 6,765,317 | B2 | * | 7/2004 | Chu .............................. | 307/150 |
| 7,936,576 | B2 | * | 5/2011 | Ham ............................. | 363/143 |
| 2009/0241283 | A1 | * | 10/2009 | Loveless et al. .............. | 15/319 |
| 2010/0051596 | A1 | * | 3/2010 | Diedrick et al. ........... | 219/137.2 |
| 2011/0127833 | A1 | * | 6/2011 | Wu et al. ....................... | 307/31 |

FOREIGN PATENT DOCUMENTS

| JP | A-8-154392 | | 6/1996 |
|---|---|---|---|
| JP | 10315148 A | * | 12/1998 |
| JP | 2004261909 A | * | 9/2004 |
| JP | 2006052660 A | * | 2/2006 |
| JP | 2011020187 A | * | 2/2011 |

* cited by examiner

*Primary Examiner* — Eduardo Colon Santana
(74) *Attorney, Agent, or Firm* — Oliff & Berridge, PLC

(57) ABSTRACT

A power tool includes a motor, a first device and a second device. The motor receives a supply of an electric power from a power source externally of the power tool. The first device determines if the electric power supplied from the power source is an AC power or a DC power. The second device permits or interrupts the supply of the electric power to the motor depending on the determination of the first device.

13 Claims, 5 Drawing Sheets

POWER TOOLS

This application claims priority to Japanese patent application serial number 2007-179253, the contents of which are incorporated herein by reference.

BACKGROUND OF THE INVENTION

1. Field of the Invention

The present invention relates to power tools in which a rotational speed control of a motor is performed by adjusting an AC power, which may be supplied to the motor via a power cord having a plug connectable to an electrical outlet.

2. Description of the Related Art

A known technique of controlling a rotational speed of a motor connectable to an AC power source having a commercial frequency is disclosed in Japanese Laid-Open Patent Publication No. 8-154392. A rotational speed control device for a motor of this publication is shown in FIG. 5 and includes a control section, a correction section and a signal converting section. The rotational speed is controlled by the operation of a switching element, so that potential deviation of a rotational speed from a set value can be decreased. The rotational speed can be detected by a rotational speed detecting device. The set value can be set by a rotational speed setting device. More specifically, the rotational speed control device can vary the on-operation timing of the switching element depending on the phase of the AC power source voltage, so that the period of time for supplying the power to the motor can be adjusted for controlling the rotational speed of the motor. This control technique is known as a phase control technique and has been generally applied to control circuits for power tools for use with AC power sources.

Power tools for use with AC power sources generally have a power source cord with a plug and are used by inserting the plugs into electrical outlets. Therefore, the configurations of the plugs are determined to correspond to the configurations of the electrical outlets. For this reason, normally, the plugs cannot be used for connection with outlets of DC power sources. However, some welding machines having engines and are distributed in the countries other than Japan that have DC outlets that are similar to normal AC outlets. With this configuration it is possible that the plugs of power tools for use with AC power sources are wrongly connected to such DC outlets.

In the case that the plugs of power tools for use with AC power sources and having the aforementioned rotational speed control devices for motors are connected to DC outlets, the switching elements may not be switched off once they have been switched on. Therefore, the motors may continuously receive maximum power. As a result, the motors are driven at a full rotational speed and therefore without any speed control of the motor.

Therefore, there is a need in the art for power tools that have a function of distinguishing a power source between an AC power source and a DC power source.

SUMMARY OF THE INVENTION

One aspect according to the present invention includes a power tool that can determine if electric power supplied from a power source to a motor is AC power or DC power. Based on this determination, the supply of the electric power to the motor can be permitted or interrupted.

DETAILED DESCRIPTION OF THE INVENTION

Figure 1:
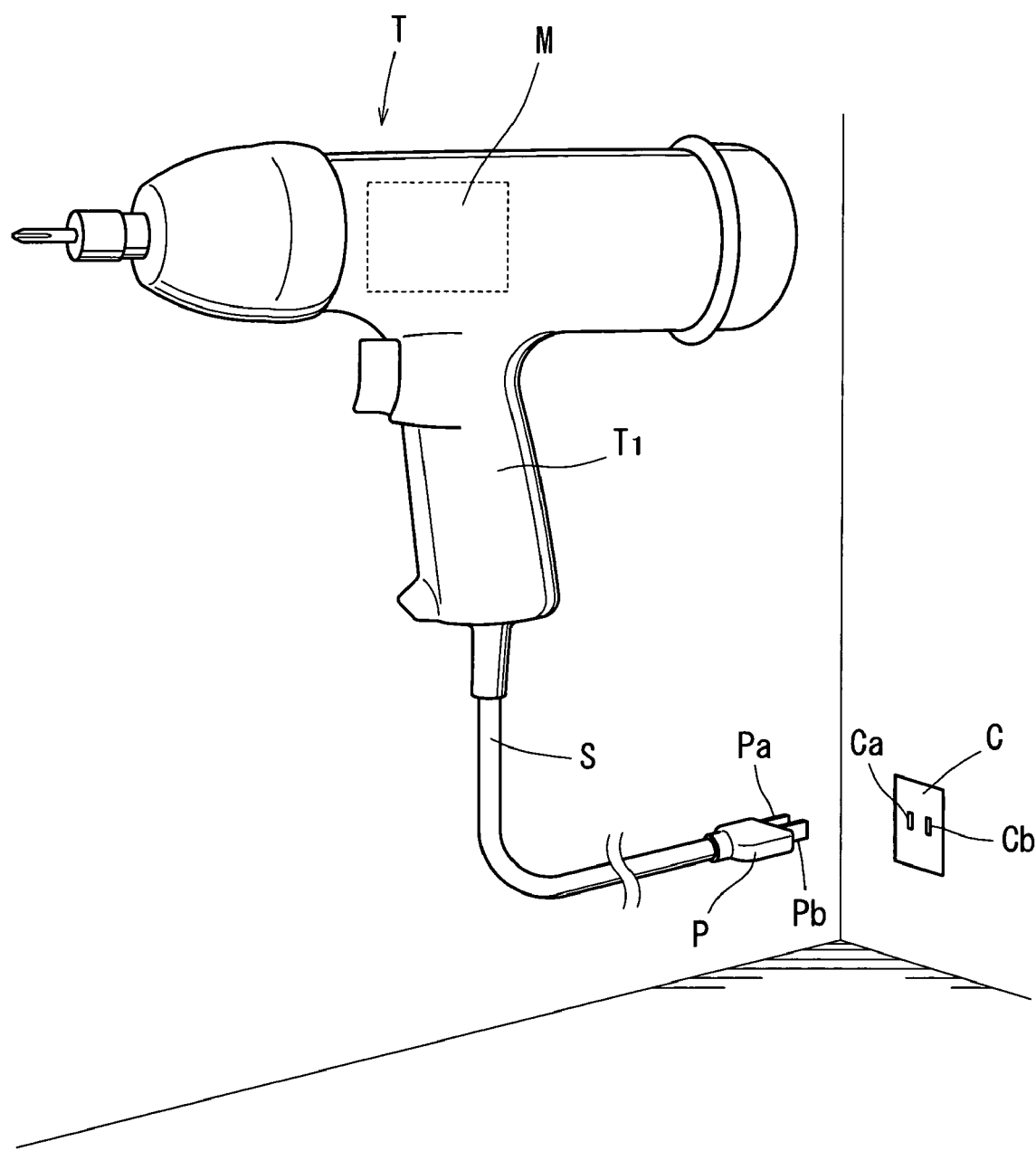
FIG. 1 is a schematic perspective view of a power tool according to an embodiment of the present invention and showing a plug of the power tool and an electrical outlet for connection with the plug.

Each of the additional features and teachings disclosed above and below may be utilized separately or in conjunction with other features and teachings to provide improved power tools. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a power tool includes a motor and a power source cord connected to the motor. The power source cord has a plug for electrically connecting to an electrical outlet. A phase control device performs a phase control of an AC power that is supplied to the motor via the power source cord, so that a rotational speed of the motor can be controlled. A power supply device serves to supply a power to the phase control device for the operation of the phase control device. A power source determining device determines whether a power source supplied from the electrical outlet is an AC power source or a DC power source when in the state where the plug is electrically connected to the electrical outlet. If the power source determining device determines the power source to be a DC power source, the power source determining device outputs an OFF signal to the power supply device, so that no power is supplied from the power supply device to the phase control device. If the power source determining device determines the power source to be an AC power source, the power source determining device outputs an ON signal to the power supply device, so that the power is supplied from the power supply device to the phase control device.

With this arrangement, if the power source determining device determines the power source to be a DC power source, no power is supplied from the power supply device to the phase control device. Therefore, the motor may not rotate, and as a result, the motor rotation is controllable. On the other hand, if the power source determining device determines the power source to be an AC power source, the power is supplied from the power supply device to the phase control device. Therefore, the motor can rotate while it receives the supply of AC power that is controlled by the phase control device.

The power source determining device may determine whether the power source is a DC power source or an AC power source based on a voltage waveform of the power supplied from the power source.

The power source determining device may include a signal producing device and a control device. The signal producing device can produce an output signal representing a voltage of the power from the power source. The control device can receive the output signal from the signal producing device and can determine whether the power is an AC power or a DC power based on the output signal.

In another embodiment, a power tool includes a motor, a first device and a second device. The motor can receive a supply of an electric power from a power source externally of the power tool. The first device can determine whether the electric power supplied from the power source to the motor is an AC power or a DC power. The second device can permit or interrupt the supply of the electric power to the motor depending on the determination of the first device. The power tool may further include a third device electrically connected to the second device. The third device can perform a phase control of the power to be supplied to the motor for controlling the rotational speed of the motor.

An embodiment of the present invention will now be described with reference to FIGS. 1 to 4. Referring to FIG. 1, a power tool T for use with an AC power source has a power source cord S. The power source cord S extends from a tool body T1 for the supply of power to a motor M disposed within the tool body T1. The power source cord S has a plug P at one end for connecting to an electrical outlet C of a commercially available AC power source. The plug P has terminals Pa and Pb for electrically connecting to corresponding terminals Ca and Cb of the electrical outlet C.

Figure 2:
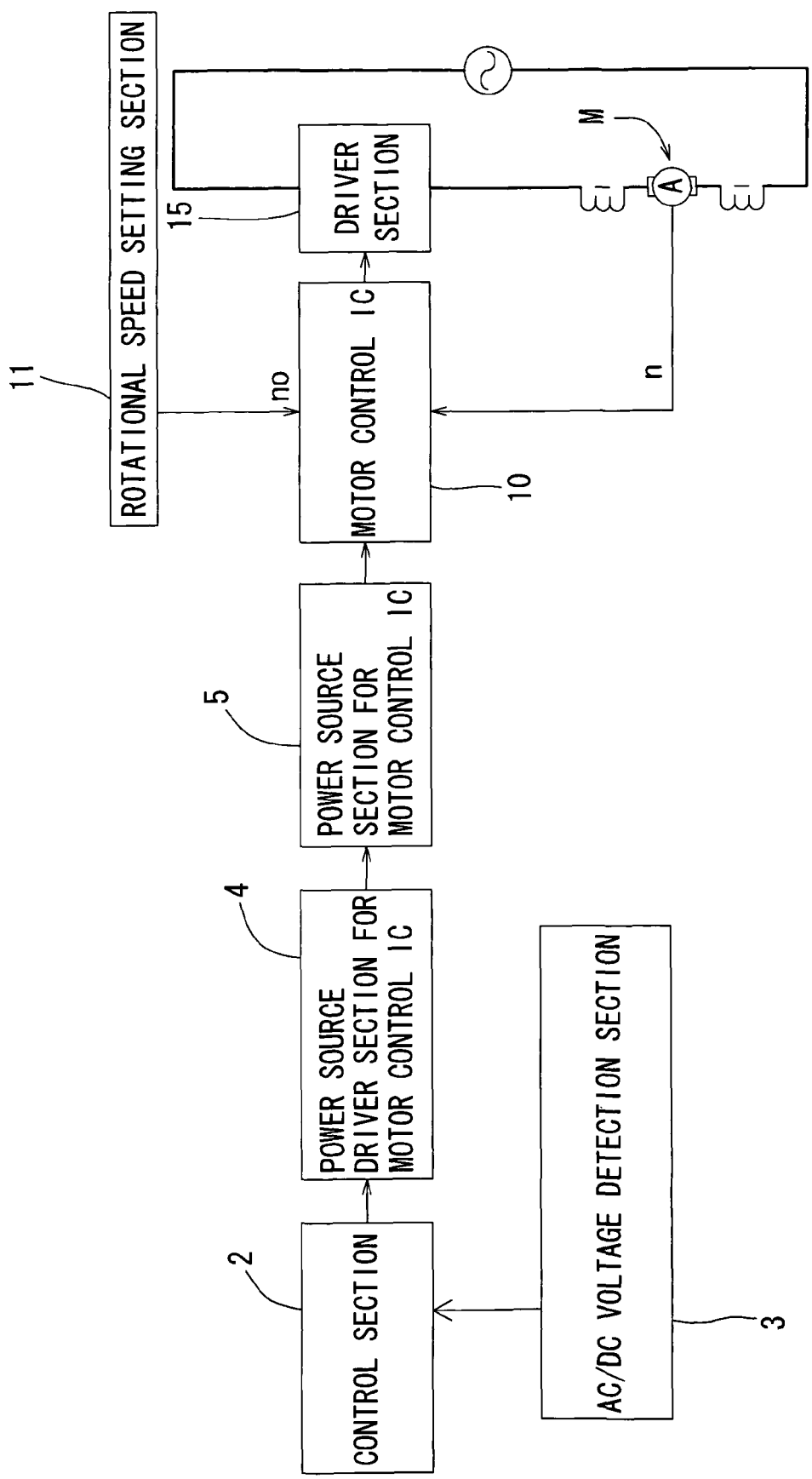
FIG. 2 is a block diagram of a motor control circuit of the power tool.
Figure 3:
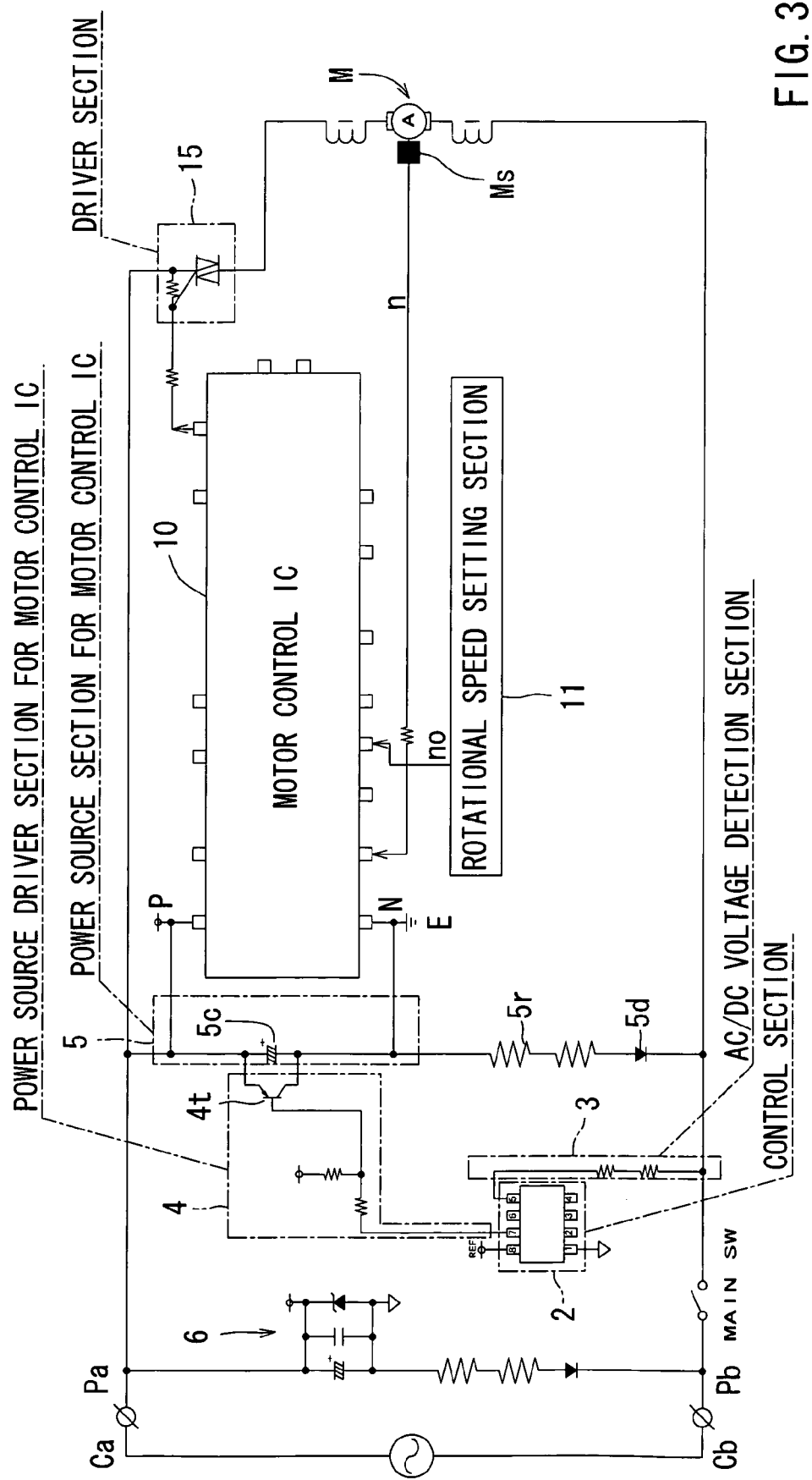
FIG. 3 is a circuit diagram of the motor control circuit.

Within the tool body T1, a speed control device shown in FIGS. 2 and 3 is disposed for controlling the motor M. The speed control device includes a motor control IC 10 and a driver section 15 that includes a bi-directional thyristor (triac). Based on a set speed signal n0 from a rotational speed setting section 11, the motor control IC 10 controls the driver section 15 such that a rotational speed n of the motor M becomes close to the set speed n0. More specifically, the motor control IC 10 outputs a trigger pulse to the triac of the driver section 15 to vary ON-operation timings of the triac depending on the phase of AC power source voltage, so that a difference between the set speed n0 and a rotational speed n of the motor M decreases. With this operation, the period of time of supplying the power to the motor M can be controlled. The rotational speed of the motor M can be detected by a rotational speed detecting device Ms shown in FIG. 3. In this way, the motor control IC 10 and the driver section 15 serves as a phase control device.

For permitting and interrupting the supply of power to the motor control IC 10, the speed control device further includes a power source section 5 and a power source driver section 4 for the motor control IC 10, a control section 2 and an AC/DC voltage detecting section 3.

<AC/DC Voltage Detecting Section 3 and Control Section 2>

The AC/DC voltage detecting section 3 and the control section 2 are capable of determining whether the power source is an AC power source or a DC power source when the plug P attached at one end of the power source cord S is inserted into the electrical outlet C to electrically connect the terminals Pa and Pb of the plug P to the corresponding terminals Ca and Cb of the electrical outlet C as shown in FIG. 3. The AC/DC voltage detecting section 3 has a resistor connected between an input terminal of the control section 2 and an electrical line from the terminals Pb and Cb. The resistor serves to introduce a waveform signal of the power source voltage to the input terminal of the control section 2. The control section 2, which may be a microcomputer, is configured to receive power from a control power source 6. The control section 2 can determine whether the power source is an AC power source or a DC power source based on the waveform signal of the power source voltage inputted from the AC/DC voltage detecting section 3. Thus, if the waveform varies as pulses, the power source may be determined to be an AC power source. If the waveform does not vary with time or shows a constant voltage, the power source may be determined to be a DC power source.

If the control section 2 determines the power source to be an AC power source, the control section 2 outputs an ON signal (0 signal) to the power source driver section 4 for the motor control IC 10. On the other hand, if the control section 2 determines the power source to be a DC power source, the control section 2 outputs an OFF signal (+V signal) to the power source driver section 4. In this way, the AC/DC voltage detecting section 3 and the control section 2 serve as a power source determination device.

<Power Source Section 5 and Power Source Driver Section 4 for Motor Control IC 10>

The power source section 5 is configured to supply a constant DC voltage to the motor control IC 10 and includes a capacitor 5c, a resistor 5r and a diode 5d that are connected in series with each other. The motor control IC 10 is connected in parallel to the capacitor 5c via power source terminals M and N. The terminal N is connected to the ground E.

The power source driver section 4 serves to switch on and off the power source section 5 based on an output signal from the control section 2 and includes a transistor 4t connected in parallel to the capacitor 5c. The transistor 4t has a base serving as an input terminal to which the output signal from the control section 2 is inputted.

Therefore, if the control section 2 determines the power source to be an AC power source and outputs an ON signal (0 signal), the transistor 4t of the power source driver section 4 is brought to a non-conductive state, i.e., an OFF state, so that a predetermined voltage is applied between the terminals of the capacitor 5c of the power source section 5 and between the power source terminals M and N of the motor control IC 10. In other words, the power is supplied to the motor control IC 10.

If the control section 2 determines the power source to be a DC power source and in the case that the terminals Pa and Pb of the plug P are connected to a positive terminal and a negative terminal of a DC power source, respectively, the control section 2 outputs an OFF signal (+V signal). The transistor 4t of the power source driver section 4 is then brought to a conductive state, i.e., an ON state, so that no voltage is applied between the terminals of the capacitor 5c of the power source section 5 and between the power source terminals M and N of the motor control IC 10. In other words, no power is supplied to the motor control IC 10. Also in the case that the terminals Pa and Pb of the plug P are connected to a negative terminal and a positive terminal of a DC power source, respectively, no voltage is applied between the power source terminals M and N of the motor control IC 10, so that no power is supplied to the motor control IC 10.

In this way, the power source section 5 and the power source driver section 4 serve as a power supply device for the motor control IC 10.

<Control Process of Power Tool>

Figure 4:
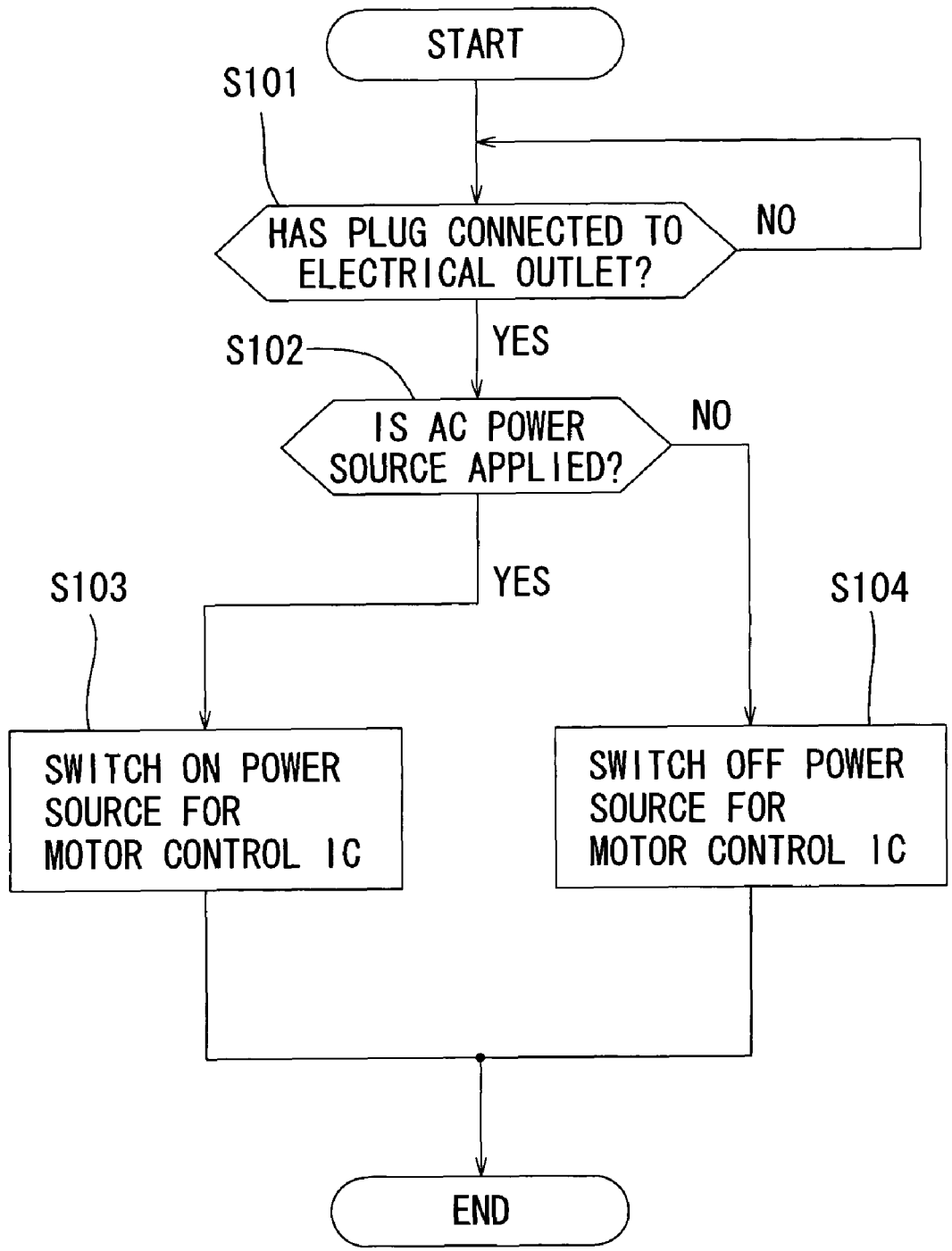
FIG. 4 is a flowchart showing a control process of the motor.
Figure 5:
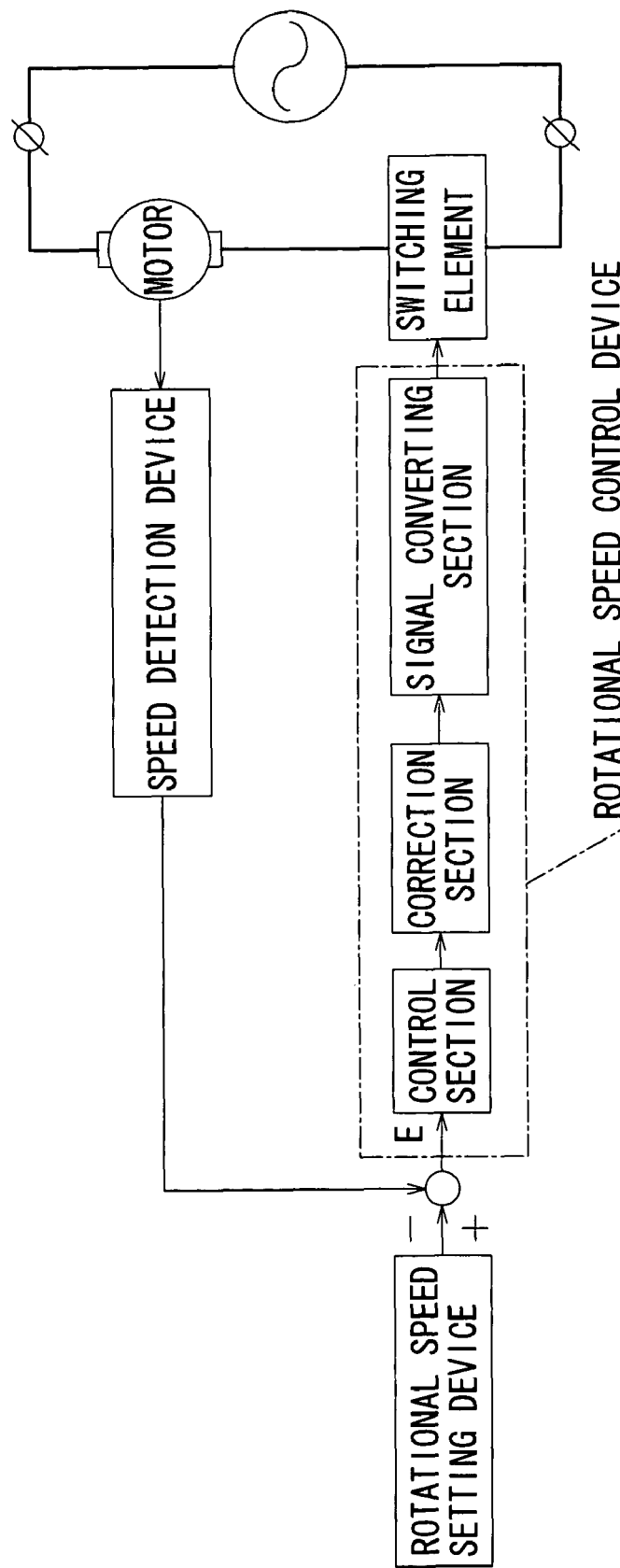
FIG. 5 is a block diagram of a known motor control circuit.

The control process of the power tool T according to the above embodiment will now be described with reference to FIG. 4. The process first proceeds to Step S101, in which the determination is made whether or not the terminals Pa and Pb of the plug P of the power source cord S of the power tool T are connected to corresponding terminals Ca and Cb of the electrical outlet C. If the determination in Step S101 is "YES", the process proceeds to Step S102, where the determination is made whether or not a power source of the outlet C is an AC power source by the power source determination device including the AC/DC voltage detecting section 3 and the control section 2. If the determination in Step S102 is "NO", i.e., if the power source is a DC power source, the process proceeds to Step S104, in which no power is supplied to the motor control IC 10. Thus, as described previously, the control section 2 outputs an OFF signal (+V signal) to bring the transistor 4t of the power source driver section 4 to a conductive state, so that no power is supplied to the motor control IC 10. Therefore, the motor M may not be driven.

If the determination in Step S102 is "YES", i.e., if the power source is an AC power source, the process proceeds to Step S103, in which the power is supplied to the motor control IC 10. Thus, as described previously, the control section 2 outputs an ON signal (+V signal) to bring the transistor 4t of the power source driver section 4 to a non-conductive state, so that the power is supplied to the motor control IC 10. Therefore, the motor control IC 10 operates to drive the driver section 15 to perform the rotational speed control of the motor M.

<Advantages of Power Tool T of the Embodiment>

According to the power tool T of this embodiment, the power source determination device (i.e., the AC/DC voltage detecting section 3 and the control section 2) is provided for determining whether the power source of the outlet C connected to the plug P is an AC power source or a DC power source. If the power source determination device determines the power source to be a DC power source, the power source determination device outputs an OFF signal to the power supply device (i.e., the power source section 5 and the power source driver section 4), so that the power supply device interrupts the supply of power to the motor control IC 10. Thus, if the plug P is connected to a DC power source, the power supply device does not supply power to the motor control IC 10. Hence, the motor control IC 10 does not operate. As a result, the motor M may not rotate. This configuration safeguards from a situation where the motor M is driven but the rotation of the motor M cannot be controlled.

If the power source determination device determines the power source to be an AC power source, the power source determination device outputs an ON signal to the power supply device, so that the power supply device supplies the power to the motor control IC 10. With this configuration the motor control IC 10 can control the power to be supplied to the motor M.

The present invention may not be limited to the above embodiment but may be modified in various ways. For example, although the motor control IC 10, the control section 2 and the AC/DC voltage detecting section 3 are configured as separate sections from each other, it is possible to configure the motor control IC 10 such that the motor control IC 10 can also perform the same function as the control section 2.

This invention claims:

1. A power tool comprising:
   a motor;
   a power source cord connected to the motor and having a plug constructed to be electrically connected to an electrical outlet;
   a phase control device constructed to perform a phase control of an AC power that is supplied to the motor via the power source cord, so that a rotational speed of the motor can be controlled;
   a power supply device constructed to supply a power to the phase control device for the operation of the phase control device; and
   a power source determining device constructed to determine if a power source supplied from the electrical outlet is an AC power source or a DC power source; wherein:
   when the power source determining device determines the power source to be a DC power source, the power source determining device outputs an OFF signal to the power supply device, so that no power is supplied from the power supply device to the phase control device; and
   when the power source determining device determines the power source to be an AC power source, the power source determining device outputs an ON signal to the power supply device, so that the power is supplied from the power supply device to the phase control device;
   the power source determining device is further configured to determine if the plug is connected to the electrical outlet; and
   the determination as to whether the power source supplied from the electrical outlet is an AC power source or a DC power source is made when the connection of the plug to the electrical outlet is determined.

2. The power tool as in claim 1, wherein the power source determining device determines the power source to be a DC power source or an AC power source based on a voltage waveform of the power supplied from the power source.

3. The power tool as in claim 1, wherein the power source determining device comprises;
   a signal producing device constructed to produce an output signal representing a voltage of the power from the power source; and
   a control device configured to receive the output signal from the signal producing device and to determine if the power is an AC power or a DC power based on the output signal.

4. A power tool comprising:
   a motor constructed to receive a supply of an electric power from a power source externally of the power tool;
   a first device constructed to determine if the electric power supplied from the power source to the motor is an AC power or a DC power; and
   a second device constructed to interrupt the supply of the electric power to the motor depending on the determination of the first device;
   wherein the first device is further configured to determine if the power tool is connected to the power source.

5. The power tool as in claim 4, further comprising:
   a third device electrically connected to the second device and configured to perform a phase control of the power to be supplied to the motor for controlling the rotational speed of the motor.

6. The power tool as in claim 4, wherein the second device comprises;
   a signal producing device constructed to produce an output signal representing a change of voltage of the power from the power source; and
   a control device configured to receive the output signal from the signal producing device and to determine if the power is an AC power or a DC power based on the output signal.

7. The power tool as in claim 6, wherein the output signal represents a waveform of a voltage of the power.

8. The power tool as in claim 7, wherein the signal producing device comprises a resistor, so that the resistor converts the power from the power source into the output signal that is suited to be supplied to the control device.

9. The power tool as in claim 6, wherein the control device comprises a microcomputer.

10. A power tool comprising:
a motor;
a power supply device constructed to supply a power to a phase control device for the operation of the phase control device; and
a power source determining device constructed to determine if a power source supplied from the electrical outlet is an AC power source or a DC power source wherein, when the power source determining device determines the power source to be a DC power source, the power source determining device outputs an OFF signal to the power supply device, so that no power is supplied from the power supply device to the phase control device; and
wherein the power source determining device is further configured to determine if the power is supplied from the electrical outlet; and
wherein the determination if the power source supplied from the electrical outlet is an AC power source or a DC power source is made when the supply of power from the electrical outlet is determined.

11. The power tool as in claim 10, wherein the power source determining device determines the power source to be the DC power source based on a voltage waveform of the power supplied from the power source.

12. The power tool as in claim 10, wherein the power source determining device comprises;
a signal producing device constructed to produce an output signal representing a voltage of the power from the power source; and
a control device configured to receive the output signal from the signal producing device and to determine if the power is the DC power based on the output signal.

13. The power tool as in claim 10, wherein the phase control device is capable of performing a phase control of power that is supplied to the motor, so that a rotational speed of the motor can be controlled.

* * * * *